(12) United States Patent
Kyriakoglou

(10) Patent No.: US 7,530,487 B2
(45) Date of Patent: May 12, 2009

(54) METHOD OF WELDING ONTO THIN COMPONENTS

(75) Inventor: Ioannis Kyriakoglou, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 11/144,599

(22) Filed: Jun. 6, 2005

(65) Prior Publication Data

US 2006/0000875 A1 Jan. 5, 2006

(30) Foreign Application Priority Data

Jul. 1, 2004 (GB) ................................. 0414913.4

(51) Int. Cl.
*B23K 20/12* (2006.01)
*B29C 65/06* (2006.01)
(52) U.S. Cl. ................. 228/112.1; 228/113; 228/114.5; 156/73.5
(58) Field of Classification Search ................. 228/159, 228/110.1, 112.1, 113, 114.5; 156/73.5
See application file for complete search history.

(56) References Cited

U.S. PATENT DOCUMENTS

| | | | | | |
|---|---|---|---|---|---|
| 3,777,360 | A | * | 12/1973 | Welch | ...................... 228/114.5 |
| 4,331,280 | A | * | 5/1982 | Terabayashi et al. | ..... 228/114.5 |
| 5,428,198 | A | * | 6/1995 | Peigney et al. | ................. 219/61 |
| 5,492,264 | A | * | 2/1996 | Wadleigh | .................. 228/112.1 |
| 5,975,406 | A | * | 11/1999 | Mahoney et al. | .......... 228/112.1 |
| 6,334,571 | B1 | * | 1/2002 | Shantz et al. | ................ 228/256 |
| 6,422,449 | B1 | * | 7/2002 | Ezumi et al. | .............. 228/114.5 |
| 6,478,545 | B2 | * | 11/2002 | Crall et al. | ............... 416/213 R |
| 6,554,177 | B2 | * | 4/2003 | Foster et al. | .............. 228/112.1 |
| 6,676,007 | B2 | * | 1/2004 | Stevenson et al. | ......... 228/112.1 |
| 6,703,093 | B2 | * | 3/2004 | Foster | ......................... 428/36.9 |
| 7,021,519 | B2 | * | 4/2006 | Foster et al. | .............. 228/112.1 |
| 2002/0061373 | A1 | * | 5/2002 | Foster | ......................... 428/36.5 |
| 2003/0141344 | A1 | * | 7/2003 | Foster et al. | .............. 228/114.5 |
| 2006/0138197 | A1 | * | 6/2006 | Aota et al. | ................. 228/112.1 |
| 2006/0169748 | A1 | * | 8/2006 | Ezumi et al. | .............. 228/112.1 |

FOREIGN PATENT DOCUMENTS

| EP | 1 266 716 A1 | 12/2002 |
|---|---|---|
| EP | 1 329 279 A1 | 7/2003 |
| WO | WO 95/32833 | 12/1995 |

\* cited by examiner

*Primary Examiner*—Kiley Stoner
(74) *Attorney, Agent, or Firm*—Oliff & Berridge, PLC

(57) ABSTRACT

A boss 10 is welded onto a thin casing 12. The casing 12 is held in a fixture (not shown) with a backing plate 20 adjacent surface 18. The backing plate 20 is located on the opposite side from the surface 14 onto which the boss 10 is to be welded. By using a backing plate 20 the depth of the weld zone, h, can exceed the casing thickness, t. The backing plate 20 is sacrificial and is released by removing the central part of the boss 10 where it has been bonded to the plate 20. Provided that the diameter $D_1$ of the central part of the boss 10 exceeds the diameter of the bonded region $D_2$ the plate 20 is released from the casing 12.

9 Claims, 1 Drawing Sheet

METHOD OF WELDING ONTO THIN COMPONENTS

The present invention relates to welding and in particular concerns friction welding onto thin components.

BACKGROUND

Forging has been used to manufacture thin components such as aero-engine casings. The manufacture of engine casings from forgings is expensive in terms of material wastage and in machining time. Typically ninety five percent of the forged material is removed during the machining of aero-engine casings. This low material utilization is a consequence of including within the wall thickness of the forging, features such as bosses and the like. Bosses are common features on aero-engine casings since they are used extensively for mounting pipes and vane spigots.

As an alternative to using forgings it has been proposed that aero-engine casings should be manufactured from thin material, either roll forged or sheet material. Welding techniques are then used to attach bosses and other features to the thin material.

Attempts to inertia or friction weld bosses to structures manufactured from thin material have not been successful. The thin material cannot support the high loads generated during the friction welding process. This results in the boss punching through the thin material before a satisfactory weld is achieved.

SUMMARY OF THE INVENTION

The present invention seeks to provide an improved method in which bosses or other features can be welded onto the surface of a thin component.

According to the present invention a method of welding onto thin components having two opposing surfaces comprises the steps of placing a support member adjacent one of the opposing surfaces, welding a feature onto the other opposing surface and releasing the support member by machining through the feature and in particular by machining through the central region of the feature.

The method may include the further step of machining the external surfaces of the feature and the component.

In the preferred embodiment of the present invention the component is an annular casing having two opposing surfaces, which are radially spaced apart.

The feature may be a cylindrical boss, which is friction welded onto the annular casing. Alternatively the feature may be inertia welded onto the casing.

The present invention will now be described with reference to and as shown in the accompanying drawings in which;

DETAILED DESCRIPTION OF THE DRAWINGS

Figure 1:
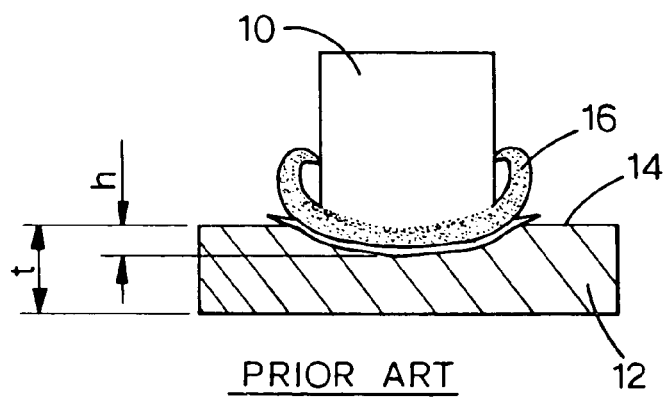
FIG. 1 is a cross-sectional view of a conventional welded assembly.

Referring to FIG. 1 a feature 10 is bonded to a surface 14 of a component 12. The feature 10 is a cylindrical boss and is bonded to the surface 14 by friction welding. Any friction welding technique may be used to join the boss 10 to the component 12 although rotary inertia welding is preferred because of the circular symmetry of the cylindrical boss 10. Other friction welding techniques may however be used, for instance linear or continuous drive friction welding.

During welding the component 12 is held in a fixture (not shown) whilst the cylindrical boss 10 is moved to cause frictional contact therebetween. The interface heats up and the adjoining surfaces become plastic so that when they are pushed together under force the boss 10 is welded to the surface 14. Material 16 is upset from the interface and is shown in FIG. 1. In friction welding the amount of "upset" is defined as the reduction in the dimensions of the components in the direction of the force applied to weld the components together.

To bond the boss 10 to the surface 14, by friction or inertia welding, the structure 12 must have a thickness, t, which can withstand both the welding forces and the penetration of the boss, h, as the material 16 is upset.

If however the component 12 is a section of a gas turbine engine casing or a gas turbine engine nozzle it is thin. By minimising the thickness, t, the weight and manufacturing cost of the casing is reduced. Difficulties, however, are encountered when friction welding bosses to the surface of thin casings. Bosses are common features on gas turbine casings since they are used extensively for mounting pipes and actuators. Boss diameters of 25 mm are not uncommon on casings having a thickness in the region of 2-5 mm.

Figure 2A:
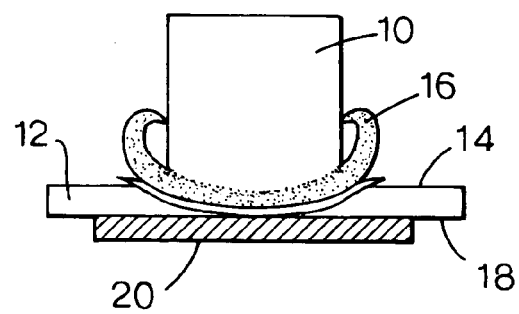
FIG. 2a is a cross-sectional view of a welded assembly including a support plate in accordance with the present invention.

FIG. 2a shows an arrangement in which a boss 10 is friction welded to a component 12 which is a gas turbine engine casing. The casing 12 is held in a fixture (not shown) and has a support member in the form of a backing plate 20 adjacent surface 18. The backing plate 20 is located on the opposite side from the surface 14 onto which the boss 10 is to be welded.

During welding material 16 is upset and the boss 10 penetrates the casing 12 to a depth that exceeds its thickness, t. The penetration is arcuate and a central part of the boss 10, having a diameter $D_2$, is welded to the backing plate 20.

Figure 2B:
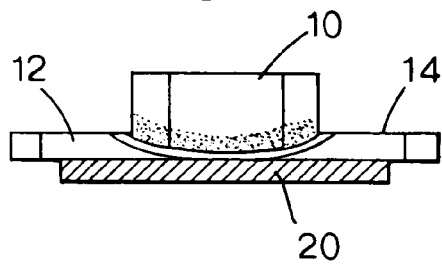
FIG. 2b shows the assembly of FIG. 2a after further machining.

After welding a further machining step is carried out on the external surfaces of the boss 10. The boss 10 is reduced in height and radiuses are put on the edges of the boss 10 and the casing 12. The upset material 16 is also removed from the surface 14 of the casing 12, FIG. 2b.

Figure 2C:
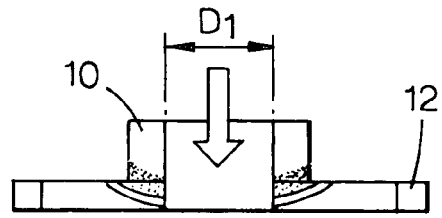
FIG. 2c shows a final assembly in accordance with the present invention in which the support plate has been removed.
Figure 2D:
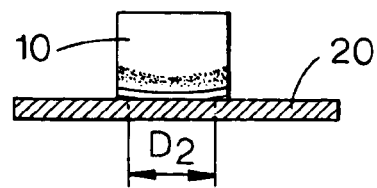
FIG. 2d shows a redundant section of the assembly and the support plate.

The central region of the boss 10 is then removed by machining, FIG. 2c. By cutting through the centre of the boss 10, at a diameter $D_1$ that is greater than $D_2$, the backing plate 20 is released from the casing 12. FIG. 2d shows the redundant central region of the boss 10 and the backing plate 20 after their removal.

By using a backing plate 20 the depth of the weld zone, h, can exceed the casing thickness, t. The backing plate 20 is sacrificial and is released by removing the central part of the boss 10 where it has been bonded to the plate 20. Provided that the diameter $D_1$ of the central part of the boss 10 exceeds the diameter of the bonded region $D_2$, the plate 20 is released from the casing 12.

It will be appreciated by one skilled in the art that the central region of the boss 10 can be machined away by any one of a number of different machining processes, including drilling, laser processing or electro-discharge machining.

I claim:

1. A method of welding onto thin components having two opposing surfaces, comprising:
   placing a support member adjacent one of the opposing surfaces,
   welding a feature onto the other opposing surface to form a weld interface between the feature and the surface, and releasing the support member,
   wherein a part of the feature is also welded to the support member and the support member is released by machining through at least a portion of the weld interface and at least that part of the feature that is welded to the support member.

2. A method as claimed in claim 1 in which the support member is released by machining through the central region of the feature.

3. A method as claimed in claim 1 in which the feature is cylindrical.

4. A method as claimed in claim 1 in which the feature is a boss.

5. A method as claimed in claim 1, which includes a further step of machining the external surfaces of the feature and the component.

6. A method as claimed in claim 1 in which the component is annular and the two opposing surfaces are radially spaced apart.

7. A method as claimed in claim 6 in which the annular component is a casing.

8. A method as claimed in claim 1 in which the feature is friction welded onto the component.

9. A method as claimed in claim 1 in which the feature is inertia welded onto the component.

\* \* \* \* \*